(12) United States Patent
Smith

(10) Patent No.: US 6,921,059 B2
(45) Date of Patent: Jul. 26, 2005

(54) METHOD FOR EVENING TENSION IN A TWISTED PAIR ELECTRIC CABLE

(75) Inventor: Chad R. Smith, Longview, TX (US)

(73) Assignee: General Cable Technologies, Corp., Highland Heights, KY (US)

( * ) Notice: Subject to any disclaimer, the term of this patent is extended or adjusted under 35 U.S.C. 154(b) by 0 days.

(21) Appl. No.: 10/067,849

(22) Filed: Feb. 8, 2002

(65) Prior Publication Data

US 2003/0151036 A1 Aug. 14, 2003

(51) Int. Cl.[7] ................................................ B23P 19/04
(52) U.S. Cl. ............................................. 254/134.3 R
(58) Field of Search ................ 254/134.3 R, 134.3 CL, 254/134.3 PA

(56) References Cited

U.S. PATENT DOCUMENTS

| | | | |
|---|---|---|---|
| 2,480,488 A | | 8/1949 | MacClatchie |
| 2,738,143 A | | 3/1956 | Hannay |
| 3,185,443 A | * | 5/1965 | Eitel ................. 254/134.3 CL |
| 3,612,596 A | * | 10/1971 | Brackin .................... 294/82.16 |
| 3,850,468 A | * | 11/1974 | Hultin ...................... 294/82.34 |
| 3,863,897 A | * | 2/1975 | Yeager ................. 254/134.3 R |
| 3,881,647 A | | 5/1975 | Wolfe |
| 4,019,715 A | * | 4/1977 | Vugrek ................. 254/134.3 R |
| 4,129,287 A | * | 12/1978 | Lindsey et al. ..... 254/134.3 PA |
| 4,152,814 A | * | 5/1979 | Ito ........................... 294/82.21 |
| 4,407,693 A | | 10/1983 | Paquin |
| 4,469,267 A | | 9/1984 | Franchuk et al. |
| 4,858,977 A | * | 8/1989 | Mitchell .................... 294/82.1 |
| 5,009,353 A | | 4/1991 | Alquist |
| 6,131,845 A | | 10/2000 | Burlingame et al. |

* cited by examiner

*Primary Examiner*—Lee D. Wilson
(74) *Attorney, Agent, or Firm*—Blank Rome LLP

(57) ABSTRACT

A method of evening the tension in the conductors of a twisted pair electric cable during the cable's installation comprising the step of pulling the cable through stlinging rollers while attached to a tension evening device. That allows constant adjustment of the tension in each of the cable's conductors, which prevents an unwanted looping effect and eliminates the need to even the tension at the end of the installation process. The tension evening device comprises a pull rope attached to a swivel that holds a sheave. The device is sized small enough so that it fits through the stringing rollers such that, during the installation of the cable, the entire tension evening device is pulled through. The sheave includes a groove around its outside diameter in which a sheave rope is placed. The ends of the sheave rope are attached to an end of each conductor. The tension in the conductors is maintained by the sheave and sheave rope which rotate in response to the tension or force applied by the conductors, providing greater slack to the higher tensioned conductor and exerting a greater pulling force on the lower tensioned conductor.

5 Claims, 6 Drawing Sheets

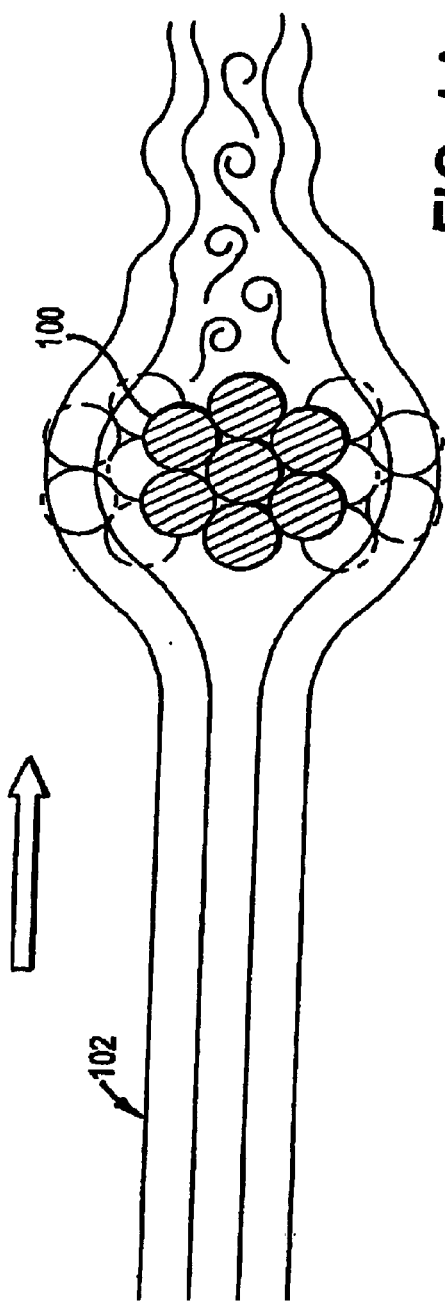
FIG. 1A AEOLIAN VIBRATION
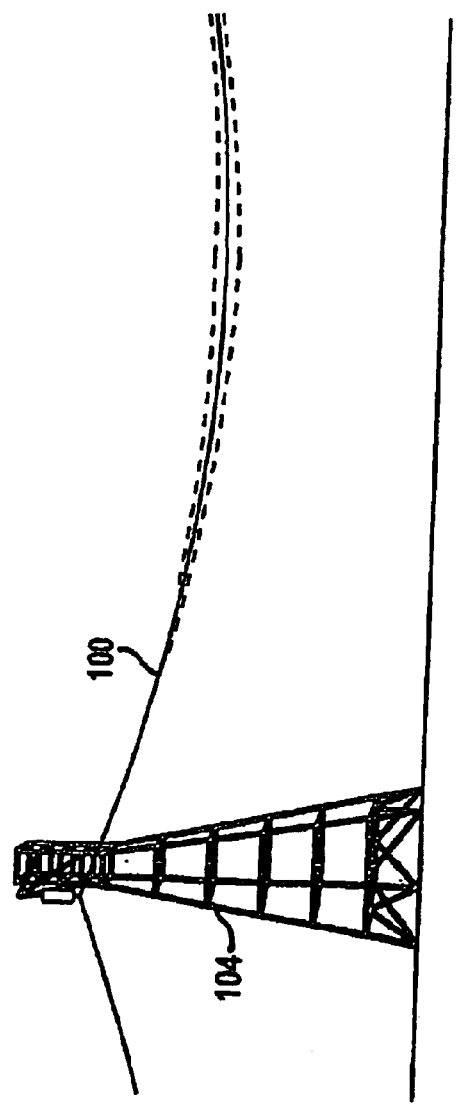
FIG. 1B AEOLIAN VIBRATION

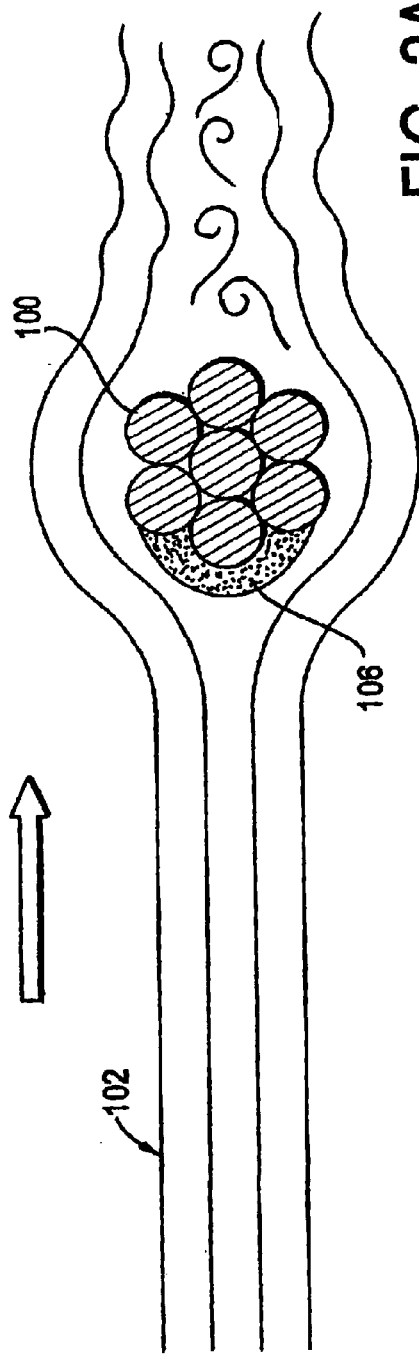
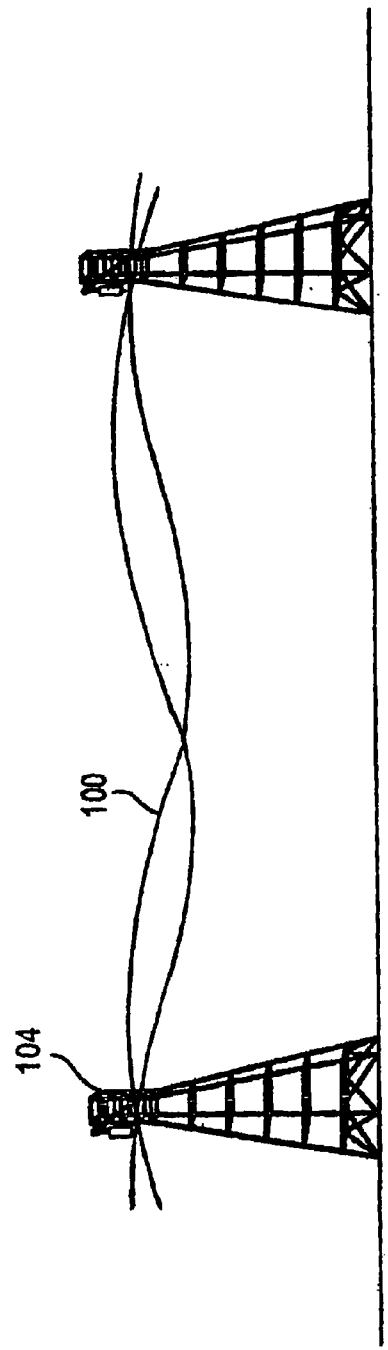
FIG. 2A GALLOPING
FIG. 2B GALLOPING

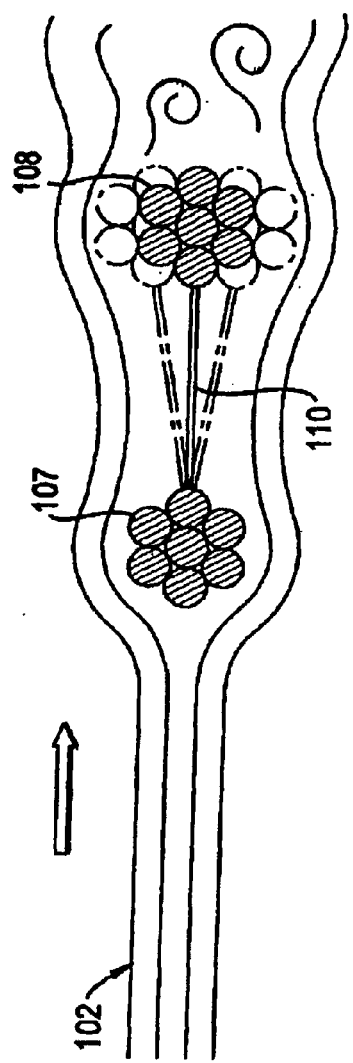
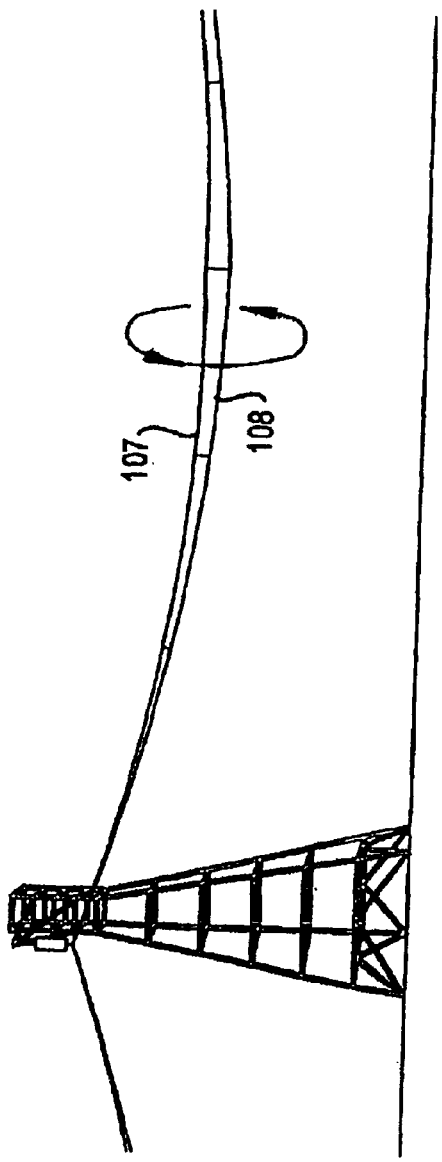
FIG. 3A
SUB-CONDUCTOR OSCILLATION
FIG. 3B
SUB-CONDUCTOR OSCILLATION

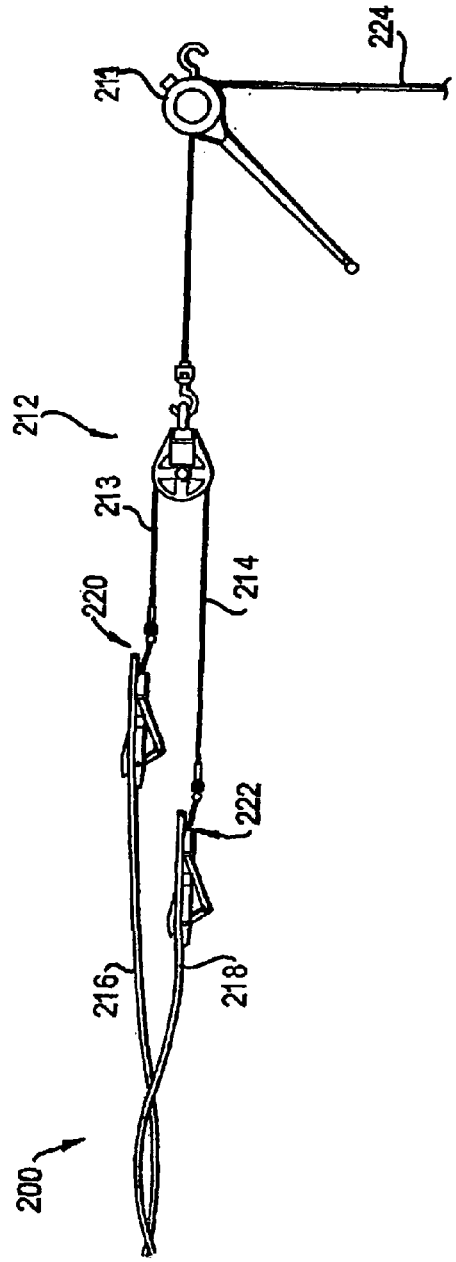
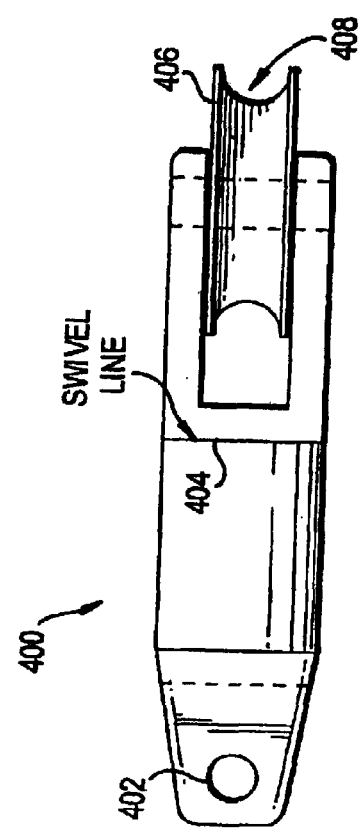
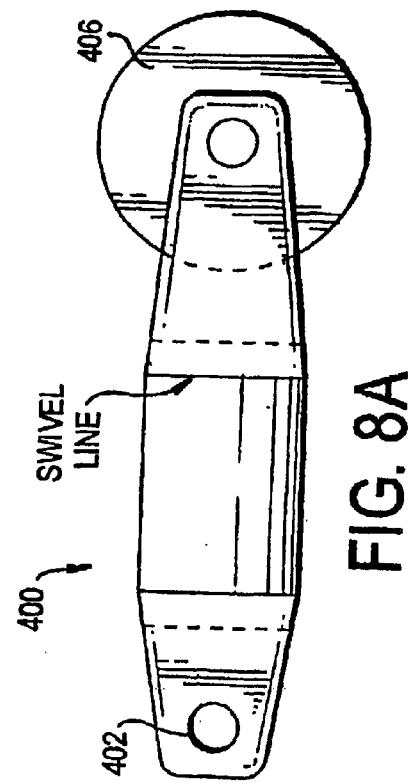
FIG. 6 PRIOR ART
FIG. 8A
FIG. 8B

METHOD FOR EVENING TENSION IN A TWISTED PAIR ELECTRIC CABLE

FIELD OF INVENTION

The present invention is directed to a method for evening the tension in the two conductors of a twisted pair (T-2) electric cable during its installation, preventing one conductor from becoming slack and looping around the other conductor and decreasing the cable's stability.

BACKGROUND OF THE INVENTION

Twisted pair (T-2) electric cables have been in use since the early 1970's, with thousands of miles of cable being installed since that time. The T-2 cable comprises two electrical conductors that are joined in a gradual twist about every 9 feet. The cable is twisted to combat wind induced motion, such as Aeolian vibration, galloping and sub-conductor oscillation, which can damage the cable's insulators and hangers.

Aeolian vibration is caused by low to moderate winds which create vortices around the electric cable, causing it to vibrate up and down. Galloping occurs when an airflow around a cable produces lift forces that cause it to move up and down in a wavelike motion. That is especially problematic when ice builds up on the front of an electric cable, creating an air-foil shape and increasing the wind induced lift forces acting on the cable. Sub-conductor oscillation occurs in non-twisted electric cable pairs where a front conductor takes the brunt force of the wind and casts a wind-shadow on a second conductor trailing the first, causing the second conductor to vibrate in an elliptical motion with respect to the first.

The twist in the T-2 cable resists the wind induced motion by constantly varying the diameter of the electric cable, preventing the build-up of resonant vibration, and producing a low torsional stiffness in the cable.

However, for the electric cable twist to remain constant and effective, it is important that equal tension in the two conductors of the cable be maintained. Uneven tension in the conductors can cause a looping or sagging effect, where one conductor loops around the other, causing a single conductor to bear the weight of both. That increases the likelihood that the electric cable will detach from a power pole, or otherwise makes the cable unstable.

Currently, an even tension is achieved in the T-2 cable by pre-twisting the conductors and binding them together using a metal band. The cable is then pulled through stringing rollers located on power poles to set up the cable for attachment to the power pole. However during this process the tension in the cables may become uneven. That can be caused by having stringing rollers that are too small or having an angle of approach that is too steep. Both these features can cause the roller to "pinch" the cable and push the twist back, thereby unevening the tension in the cable. To correct that problem, the cable is attached to a snatch block that evens the tension in the conductors after being pulled through the stringing rollers.

SUMMARY AND OBJECTS OF THE INVENTION

The present invention is directed to a method of evening the tension in the conductors of a twisted pair electric cable having the step of pulling the cable through stringing rollers while attached to a tension evening device. That allows constant adjustment to the tension in each of the conductors during its installation, preventing a looping effect and eliminating the need to even the tension at the end of the installation process.

The tension evening device has a pull rope attached to a swivel that holds a sheave. The sheave has a groove around its outside diameter in which a sheave rope is placed. The ends of the sheave rope are attached to an end of each conductor. The tension in the conductors is maintained by the sheave and sheave rope which rotate in response to the tension or force applied by the conductors, providing greater slack to the higher tensioned conductor and exerting a greater pulling force on the lower tensioned conductor. Additionally, the tension evening device is sized small enough so that it fits through the stringing rollers so that during the installation of the cable, the entire tension evening device is pulled through.

It is therefore an object of the present invention to provide a method of maintaining an even tension in a T-2 cable to prevent one of the conductors from looping around the other. It is a further object of the present invention to provide a method of maintaining an even tension during the cable's installation process to eliminate the additional step of evening the tension after the cable is pulled through the stringing rollers.

BRIEF DESCRIPTION OF THE DRAWINGS

FIG. 1A is a drawing which shows an end view of an airflow around an electric cable causing Aeolian vibration;

FIG. 1B is a drawing which shows a side view of the electric cable of FIG. 1A undergoing Aeolian vibration;

FIG. 2A is a drawing which shows an end view of an airflow around an electric cable with ice buildup causing galloping;

FIG. 2B is a drawing which shows a side view of two electric cable of FIG. 2A undergoing galloping;

FIG. 3A is a drawing which shows end view of an airflow around a non-twisted pair electric cable causing sub-conductor oscillation;

FIG. 3B is a drawing which shows a side view of the non-twisted pair electric cable of FIG. 3A undergoing sub-conductor oscillation;

FIG. 6 is a drawing which shows a prior art tension evening device;

FIG. 8A is a drawing which shows a second embodiment of a tension evening device of the present invention; and FIG. 8B is a drawing which shows a side view of the tension evening device of the present invention.

DETAILED DESCRIPTION OF THE INVENTION

Figure 4A:
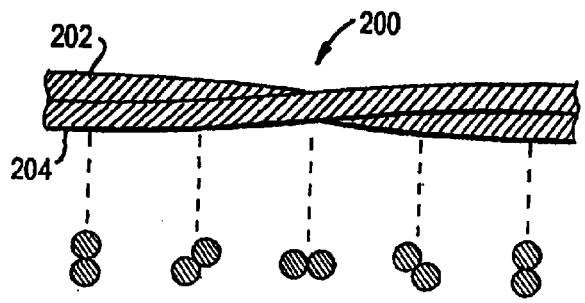
FIG. 4A is a drawing which shows a side view of a twisted pair electric cable.

Wind induced motion in electric cables can damage the cable's insulators and hangers, making it vulnerable to failure. Examples of wind induced motion in cables are shown in FIGS. 1–3. FIGS. 1A and 1B show an electric cable 100 undergoing Aeolian vibration. FIG. 1A shows an airflow 102 moving past the cable 100, creating small vortices and causing it to move in small up and down motions (shown in dotted lines). FIG. 1B shows the effect of the vibration on the cable 100 attached to a power pole 104. FIGS. 2A and 2B show an electric cable 100 undergoing a galloping effect. FIG. 2A shows the conductor 100 with ice 106 formed on its front surface and an airflow 102 moving past the cable. The airflow 102 produces a lift effect, which is heightened by the ice buildup 106, causing the cable 100 to sway up and down in a wavelike motion between the two power poles 104, as shown in FIG. 2B. FIGS. 3A and 3B show an electric cable 100 undergoing sub-conductor oscillation. The electric cable in this case has a front conductor 107 and a rear conductor 108 that are connected by a spacer 110. FIG. 3A shows an airflow 102 moving past the front conductor 107, creating a turbulent wake field that causes the rear conductor 108 to move in a circular motion about the front conductor 107, as shown in FIG. 3B.

Figure 4B:
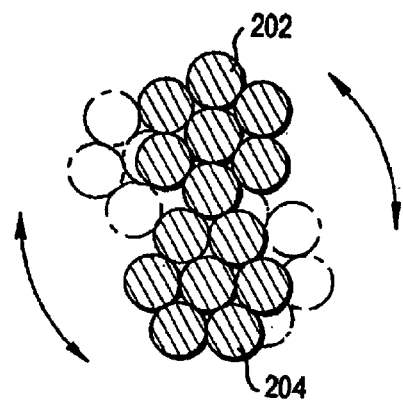
FIG. 4B is a drawing which shows an end view of the twisted pair electric cable of FIG. 4A.

Twisted pair (T-2) electric cables 200 are known and have been installed on power poles to combat these wind induced motions. FIGS. 4A and 4B show a side view and an end view of the T-2 electric cable 200, respectively. The cable 200 is made up of two conductors 202 and 204 that are twisted along its length. FIG. 4A shows the side view of the cable 200, and an end view at various points along its length. FIG. 4B shows an end view of the cable 200 similar to the end view shown in FIG. 4A, but with the changing diameter of the cable shown in dotted lines. The constant changing diameter of the cable helps to combat wind effects by stiffening the cable and preventing resonant vibration from building up.

Figure 5:
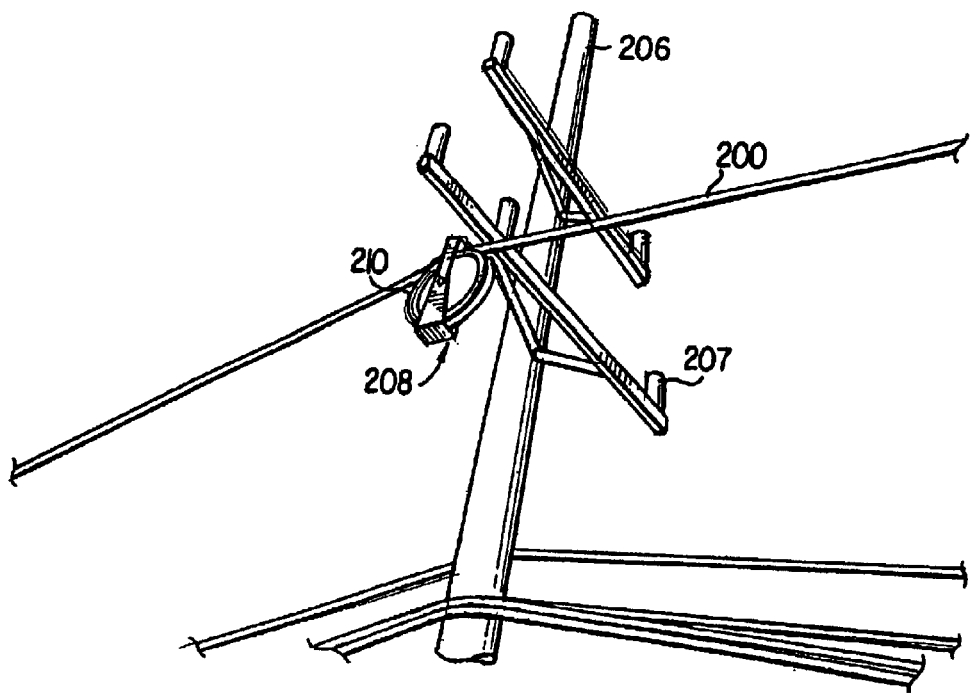
FIG. 5 is a drawing which shows a power pole with a twisted pair electric cable attached.

FIG. 5 shows a power pole 206 with a stringing roller 208 used to install T-2 cables. Typically, the T-2 cable 200 is installed on the power pole 206 by initially twisting the cable 200 and then pulling it through the stringing roller 208. After the cable 200 is pulled through, it is permanently affixed to the power pole 206 at the insulators 207. However, during the "pulling through" process, oftentimes the twist in the cable 200 becomes non-uniform. That can be caused by too small a wheel 210 in the stringing roller 208 which can "pinch" the cable 200 and not allow it to pass freely through. The twist in the cable is then pushed back, so that the cable is twisted tighter prior to the stringing roller 208 than after it. Additionally, too sharp an entry angle into the sheave of the wheel 210 aggravates that problem, pushing the twist back further.

Any uneven twist or tension in the cable 200 is corrected by using a chain hoist 211 and snatch block 212, as shown in FIG. 6, to even the tension in the T-2 cable after it is pulled through the stringing rollers 208. The snatch block 212 consists of a sheave 213 having a groove around its outside surface. A sheave rope 214 is placed within the groove, with each end of the rope being attached to one of the two conductors 216 and 218 of the T-2 cable using a first grip 220 and a second grip 222. A pull rope 224 then pulls the snatch block 212 causing the sheave 213 and the sheave rope 214 to rotate in the direction of the higher tensioned conductor. That rotation provides greater slack to the conductor having more tension, and conversely, exerts a greater pulling force on the conductor with less tension, thereby equalizing the tension in the two conductors. After the cable tensioned is evened, it is attached or deadended to the insulator 207 on the power pole 202.

In the process described above, the cable tension is evened after it has been pulled through the stringing roller 208 because the snatch block 212 is too large to pass through the wheel 210 in the stringing roller 208.

Figure 7A:
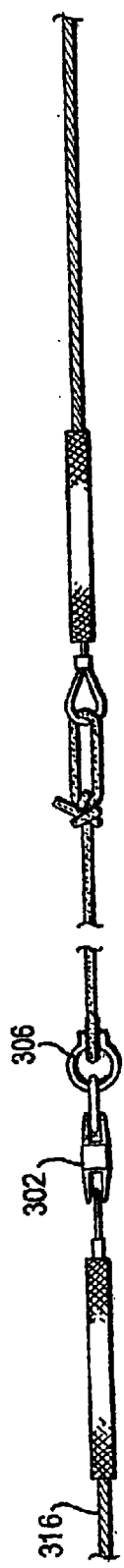
FIG. 7A is a drawing which shows a top view of a tension evening device of the present invention.
Figure 7B:
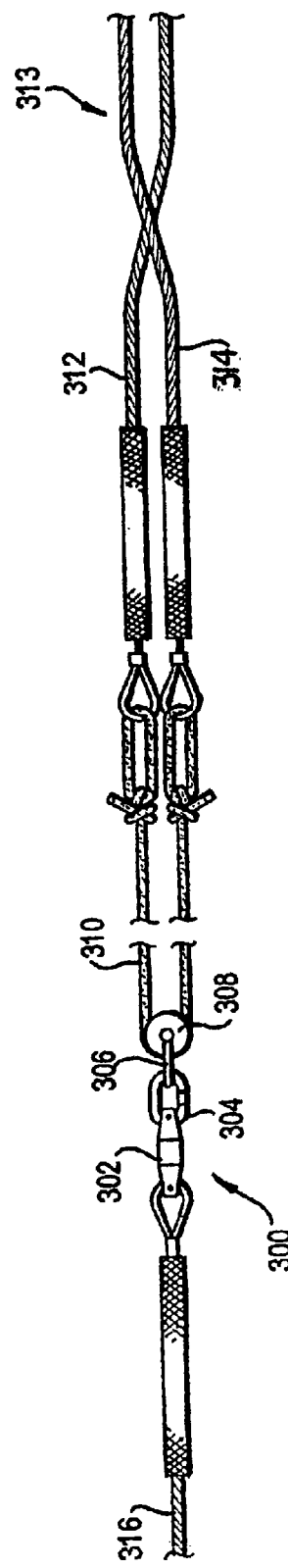
FIG. 7B is a drawing which shows a side view of the tension evening device of FIG. 7A.

The apparatus and method of the present invention is directed to a tension evening device 300 that is small enough to fit within the groove of the wheel 210 on the stringing roller 208. The tension evening device 300, shown in FIGS. 7A and 7B, allows the T-2 cable 313 to be installed while maintaining an even tension in each of the two conductors 312 and 314. It eliminates the step of having to even the tension at the end of the installation process. The tension evening device 300 of the present invention is similar to the snatch block 212 of the prior art, comprising a swivel 302, a connector link 304, a clevis 306 and a sheave 308. The sheave 308 has a groove 309 around its outer surface into which a sheave rope 310 is placed. The rope's two ends are then attached to the ends of two conductors 312 and 314. In that way when the pull rope is pulled through a stringing roller on the power pole 206, the sheave 308 and the sheave rope 310 rotate to equalize the tension in the conductors 312 and 314. And, because the tension evening device 300 is small enough to fit within the wheel 210 of the stringing roller 208, a constant tension is maintained in the T-2 cable 313 at all times.

FIGS. 8A and 8B show a second embodiment of the invention. In this embodiment, a swivel, a connector link, a clevis and a sheave have been combined so that the tension evening device 400 is made from a single component. The pull rope 316 is inserted through the opening 402 in a first end of the device 400. This first end is rotatable relative to a second end of the device about the swivel line 404. The second end of the device includes a sheave 406 having a groove 408 around its outside surface. A sheave rope is placed in the groove 408 and is attached to the ends of the conductors 312 and 314 of the T-2 cable 313. As the pull rope 316 is pulled, the sheave 406 and sheave rope (not shown) rotate to equalize the tension in the conductors as discussed above.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method of evening the tension in the conductors of a twisted pair electric cable comprising the steps of:

providing a tension evening device;

attaching an electric cable having more than one conductor to the tension evening device; and pulling the tension evening device through support blocks on a power pole whereby the tension evening device equalizes the tension in the more than one conductor.

2. The method of evening the tension in the conductors of a twisted pair electric cable of claim 1, wherein:

the tension evening device comprises a swivel, a clevis and a sheave.

3. The method of evening the tension in the conductors of a twisted pair electric cable of claim 2, wherein:

the sheave has a groove for the placement of a sheave rope, and the sheave rope has two ends, each attached to a separate conductor of the electric cable.

4. The method of evening the tension in the conductors of a twisted pair electric cable of claim 2, wherein:

the swivel, the clevis and the sheave are a single component.

5. The method of evening the tension in the conductors of a twisted pair electric cable of claim 1, wherein:
   the step of pulling the tension evening device through the support block rotates the sheave and sheave rope so that it provides greater slack to a higher tensioned conductor and exerts a greater pulling force on a lesser tensioned conductor thereby equalizing the tension in the conductors.

* * * * *